(12) United States Patent
Stephenson

(10) Patent No.: US 10,706,839 B1
(45) Date of Patent: Jul. 7, 2020

(54) ELECTRONIC SIGNATURES VIA VOICE FOR VIRTUAL ASSISTANTS' INTERACTIONS

(71) Applicant: UIPCO, LLC, San Antonio, TX (US)

(72) Inventor: Brady Carl Stephenson, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/727,323

(22) Filed: Oct. 6, 2017

Related U.S. Application Data

(60) Provisional application No. 62/412,013, filed on Oct. 24, 2016.

(51) Int. Cl.
| | |
|---|---|
| *G10L 15/00* | (2013.01) |
| *G10L 15/08* | (2006.01) |
| *G10L 15/05* | (2013.01) |
| *H04M 3/22* | (2006.01) |
| *H04M 3/493* | (2006.01) |

(52) U.S. Cl.
CPC ............. *G10L 15/08* (2013.01); *G10L 15/05* (2013.01); *H04M 3/2218* (2013.01); *H04M 3/493* (2013.01); *G10L 2015/088* (2013.01)

(58) Field of Classification Search
CPC ........................................................ G06F 17/02
USPC ..................................................... 704/1, 9, 10
See application file for complete search history.

(56) References Cited

U.S. PATENT DOCUMENTS

| | | | | | |
|---|---|---|---|---|---|
| 5,999,609 | A | * | 12/1999 | Nishimura | H04M 3/5183 379/201.01 |
| 7,016,844 | B2 | * | 3/2006 | Othmer | G06Q 10/10 704/270.1 |
| 8,260,862 | B2 | * | 9/2012 | Chatterjee | H04L 9/3271 379/93.04 |
| 8,484,031 | B1 | * | 7/2013 | Yeracaris | G10L 15/30 704/270.1 |
| 8,687,777 | B1 | * | 4/2014 | Lavian | H04M 3/493 379/88.18 |
| 2014/0140497 | A1 | * | 5/2014 | Ripa | H04M 3/5133 379/265.06 |
| 2015/0195406 | A1 | * | 7/2015 | Dwyer | H04M 3/5175 379/265.07 |
| 2016/0239805 | A1 | * | 8/2016 | Geffen | G06Q 10/10 |
| 2016/0352907 | A1 | * | 12/2016 | Raanani | G06Q 30/02 |

* cited by examiner

*Primary Examiner* — Jesse S Pullias
(74) *Attorney, Agent, or Firm* — Greensfelder, Hemker & Gale, P.C.; Joseph A. Fuchs

(57) ABSTRACT

The present invention provides a method and a system utilizing an AI entity for confirming an agreement has been entered between a first entity and a second entity during a verbal communication, capturing the portions of the communication that constitute the elements of an agreement and storing the portions for later verification of the agreement.

19 Claims, 2 Drawing Sheets

ELECTRONIC SIGNATURES VIA VOICE FOR VIRTUAL ASSISTANTS' INTERACTIONS

CROSS-REFERENCE TO RELATED APPLICATIONS

The present application claims the benefit of U.S. Provisional Patent Application Ser. No. 62/412,013 filed on Oct. 24, 2016 which is incorporated herein by reference.

FEDERALLY SPONSORED RESEARCH OR DEVELOPMENT

N/A

FIELD OF THE INVENTION

The present invention provides a system for monitoring verbal communications between a human and an AI entity or between two AI entities to recognize that an agreement has been reached by the parties to the communication and storing portions of the communication to verify an agreement has been reached.

DESCRIPTION OF THE PRIOR ART

With the advent of virtual assistants such as Apple's Siri, Microsoft's Cortana, or Amazon's Alexa, communications now occur between humans and virtual assistants and between virtual assistants and other virtual assistants, AI entities or other non-human electronic communicators. Many such communications can include the elements of a contract including an offer, an acceptance and the exchange of consideration. Such communications may not be recorded and the terms lost. Thus, it is desirable to have a system and method for determining that an agreement has been reached by two parties to a communication, capturing the pertinent portions of the conversation that constitute an agreement, and storing these contract elements for later verification of the agreement. The present invention provides an artificial intelligence (AI) entity that can be programmed (or taught for machine learning systems) to recognize communications where an affirmation of terms is required to form a legally binding agreement and to record the pertinent portions of the communications for later verification of the agreement. The pertinent portions of the communication along with all relevant metadata (date, time, user identifier, interaction device identifier [e.g. from a phone, tablet, or other connected device], etc.) are stored for future verification of the transaction.

In one form of the invention, the AI entity or machine learning algorithm will monitor conversations between a first entity (human or electronic entity) and a call center. It is well known when interacting with a call center to purchase a product or a service that the conversation may be recorded for quality assurance and training purposes. Callers or customers contacting a call center to purchase goods or services reach agreements for the purchase of the goods or service. Typically, the call center will make an offer for the transfer of an item of value to the customer at a certain price, the customer conveys an agreement to the terms of the offer, and then pays for the item. In contract law the payment is known as consideration. While certain contracts must be in writing to be enforceable, many oral contracts for the purchase of goods or services are enforceable without a written agreement. Oral contracts can remain in force for several years where either party to the contract can sue for breach of contract or other cause of action related thereto. Thus, it is important to capture and store for safekeeping the details of the terms of the offer, the acceptance by the customer and the conveyance of consideration to ensure the company complies with the contract and if the contract should be raised in a legal dispute, the company can prove the details of the oral agreement.

Notwithstanding the importance of documenting the terms of an oral agreement between a company and a customer, most call centers make no attempt to capture and record this information. While, a prior art call system may record and store every conversation it handles, it does not attempt to capture the portions of the conversation that constitute an offer, acceptance and consideration. If an oral contract comes into dispute, the company sponsoring the call center must have a human locate the pertinent recording where the oral contract was reached and review the conversation in its entirety. This can be quite time consuming.

SUMMARY OF THE INVENTION

The present invention provides a method and a system utilizing an AI entity or machine learning algorithm for confirming an agreement has been entered between a first entity and a second entity during a verbal communication, capturing the portions of the communication that constitute the elements of an agreement and storing the portions for later verification of the agreement.

The present invention also provides a method and a system for confirming an agreement has been entered between a caller using a device and an electronic call center of a company for later verification of the agreement. The method includes the steps of: (1) providing a conversation between a caller and the call center, (2) providing an interactive voice response system at the call center for interacting with oral statements of the caller and tones generated by the caller using a keypad on the device, (3) transmitting data representative of the conversation to a first artificial intelligence entity, (4) analyzing the data representative of the conversation using the first artificial intelligence entity to detect that an agreement has been reached between the caller and the company, (5) capturing, in response to detecting an agreement has been reached, portions of the conversation where an offer is made by the call center specifying terms of an exchange of items of value between the caller and the company, an acceptance of the terms of the offer by the caller, and an exchange of consideration between the caller and the company; (6) capturing metadata of the conversation; and (7) storing the metadata and the portions of the conversation in a searchable database for later verification of the agreement.

BRIEF DESCRIPTION OF THE DRAWINGS

To understand the present invention, it will now be described by way of example, with reference to the accompanying drawings in which.

DETAILED DESCRIPTION

Figure 1:
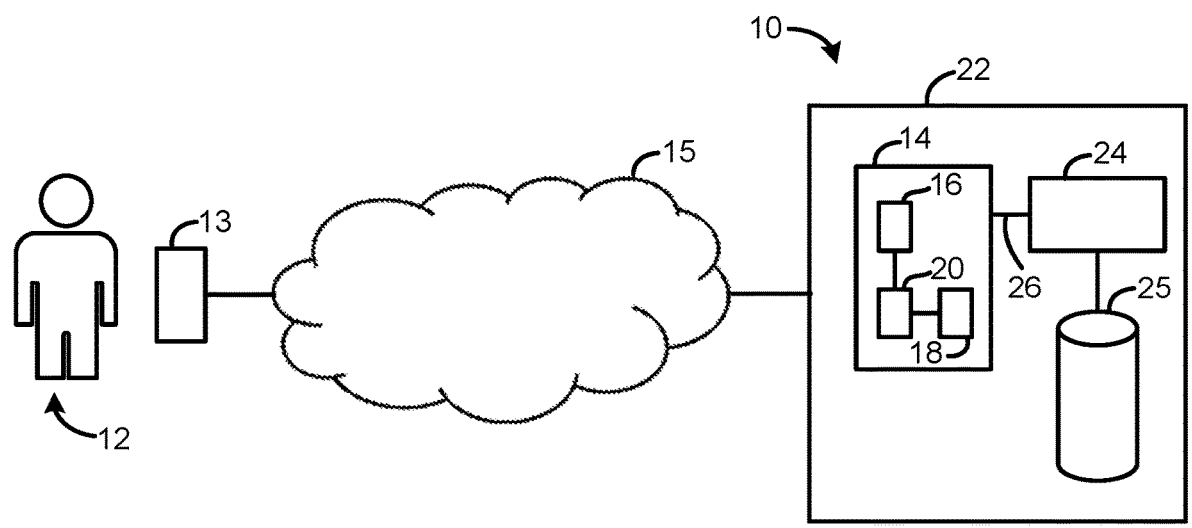
FIG. 1 is a schematic diagram of a system of the present invention where a human caller contacts a call center and interacts with an interactive voice response system monitored by a first artificial intelligence entity.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention provides a method and a system utilizing an AI entity for confirming an agreement has been entered between a first entity and a second entity during a verbal communication, capturing the portions of the communication that constitute the elements of an agreement and storing the portions for later verification of the agreement. The communication is a verbal communication, using words, or tone responses entered on a keypad by one of the entities and can be oral or in writing. The first and second entities can be a human or an electronic communicator working on the behest of an entity capable of entering into a binding agreement. An electronic communicator can be any communication device generated by computer software and hardware.

In one form of the invention, a human will communicate with a virtual entity like Siri, Alexa or Cortana, for example, to purchase a product on the Internet. The virtual entity contacts through the Internet either a human salesperson or an electronic entity to purchase the requested item. The communication is monitored by an AI entity and the AI entity is trained to recognize when an agreement has been reached, to capture the portions of the communication constituting the elements of the agreement, and storing the pertinent portions for later verification. The conversation portions can be stored with metadata relating to the communication.

Call centers engage in numerous communications with entities for the sale of goods and services. Due to the high volume of agreements entered, one form of the invention provides an AI entity to monitor call center communications. To this end, FIG. 1 shows a system 10 for confirming an agreement has been entered between a first entity 12, a human, using a device 13 to contact a second entity, a company, through a communication medium 15 to an Interactive Voice Response System (IVR) 14 implemented by a server 16 having a memory 18 and a processor 20 within a call center 22. The IVR 14 is in electronic communication with a first artificial intelligence (AI) entity 24. The AI entity 24 analyzes data representative of communications between the caller 12 and the IVR to detect when terms of an agreement have been agreed to and captures portions of the communication where an offer is made by the IVR, an acceptance of the offer is communicated by the caller, and consideration is sent by the caller to the company. It is contemplated that the caller could be the offeror and the receiver of the call could be the accepting party without departing from the scope of the present invention. Thus, a call center could call numerous individuals making or soliciting offers or individuals could contact a call center to obtain offers or to make offers. The IVR, the server, processor, memory, database and call center are conventional and well known to those of ordinary skill in the art.

Figure 2:
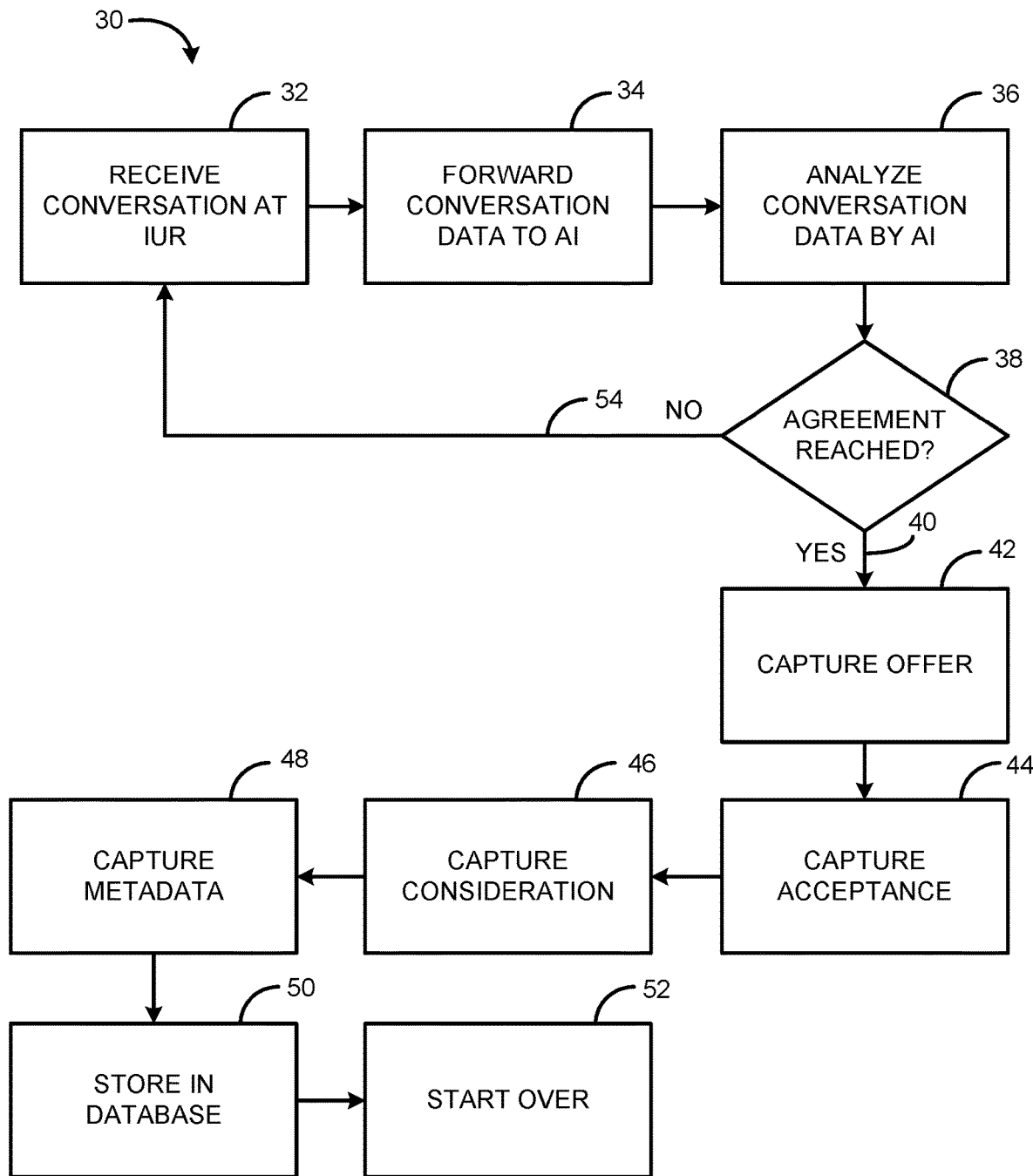
FIG. 2 is a flow chart of one method of the present invention where a human caller contacts a call center and reaches an agreement with a company sponsoring the call center.

FIG. 2 shows steps of a method for confirming an oral agreement has been reached by the first entity 12 and the company during a conversation through an electronic medium 15. The term "communication" is meant to include words spoken or written by the caller, DTMF tones entered by the caller on a keypad on the device 13, words spoken or written by the IVR, voice responses made by the IVR, and questions presented to the caller by the IVR. The IVR generates oral response through playing prerecorded messages or through synthesizing voice responses. The IVR generates written responses from a store of written responses.

In step 32, the call center receives a telephone call from the caller 12 and forwards it to the IVR. The first entity or caller 12 interacts with the IVR using the device 13 by speaking words into the device and/or entering DTMF tones on a keypad of the device 13. The device 13 can be a standard dial phone over a land line, a cellular telephone through a cellular phone network, or using a general purpose computer connected over the Internet 15 or other suitable electronic network. The IVR utilizes voice recognition software to convert the spoken words to text.

In step 34, data representative of the conversation is forwarded to the AI entity for analysis. The data can be transmitted as a data stream through connection 26 or as an audio file containing a complete conversation. The data can be in numerous forms but most preferably is in the form of a text file representing both the spoken and written words of the first entity and the DTMF tone entries by the caller.

In step 36 the AI entity analyzes the conversation data either in real time during the conversation or after the conversation is completed. The AI entity is implemented in software commonly available for purchase. The AI entity must be trained to recognize key words to determine that an agreement has been reached. It must also be trained to identify that an offer has been extended from an offering party to the other party to exchange a first item of value to the other party under specific terms. Further, it must be trained to recognize that the agreeing party has sent a second item of value to the offering party known in contract law as consideration. It may be unnecessary to train the AI entity to recognize the exchange of information if such exchange is evident from the transmittal of money electronically.

At step 38 if it is determined that an agreement has been reached 40 then the AI entity reviews the conversation data to capture a segment of the conversation constituting the offer 42, capture a segment of the conversation constituting the acceptance 44, and optionally, capturing the segment of the conversation constituting an exchange of consideration 46. Additionally, the AI entity will capture the metadata 48 to identify the conversation and in step 50 store the segments and the metadata in database 25. Then the method repeats itself in step 52 and the process starts anew at step 32 for another conversation. If no agreement is detected 54 during a conversation then the process starts over at step 32 with another conversation.

The metadata can include date, time, caller identifier, and an interactive device identifier, for example. The interactive device identifier specifies the type of device 26 used by the caller to contact the call center and includes land line telephones, cellular telephones, and general purpose computers.

Figure 3:
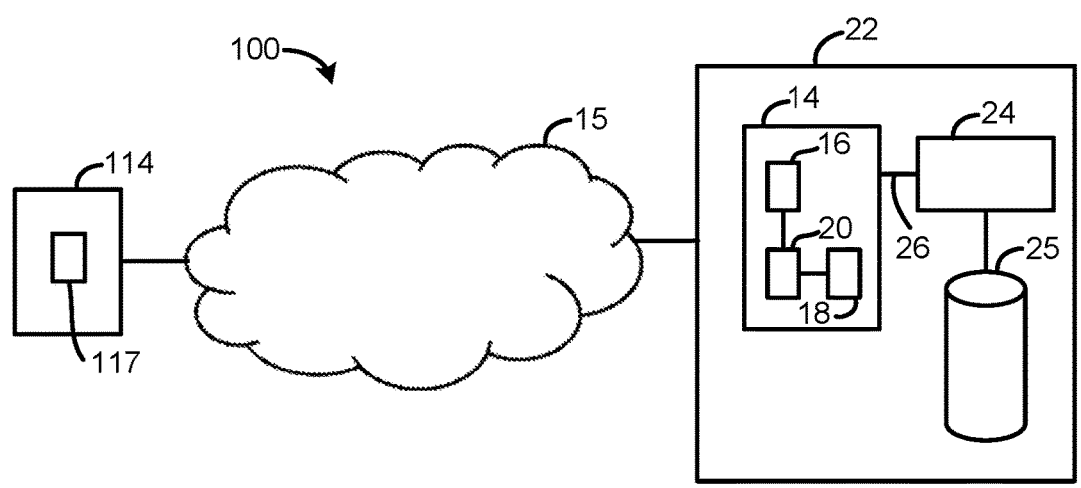
FIG. 3 is a schematic diagram of a call center interacting with a second artificial intelligence entity to reach an agreement.

FIG. 3 shows another exemplary embodiment of a system 100 that differs from the first described above by replacing a human user 12, with a second AI entity 114. The second AI entity 114 would be sponsored by a second company and have a communicator 117 capable of generating oral statements or DTMF tones for interacting with the IVR 14 of the call center 122. The second AI would be trained to communicate with call centers for the sale or purchase of goods or services to the first company. The first AI 14 would function essentially the same as described above other than adapting to interacting with an AI entity instead of a human caller.

Many modifications and variations of the present invention are possible in light of the above teachings. It is, therefore, to be understood within the scope of the appended claims the invention may be protected otherwise than as specifically described.

I claim:

1. A method utilizing an AI entity for confirming an agreement has been entered between a first entity and a second entity during a verbal communication comprising: training the AI entity to accurately recognize from an electronic representation of a conversation between two parties that an offer has been made by a first party, an acceptance has been made by a second party, and an exchange of consideration has occurred between the two parties to define a trained AI entity; identifying with the trained AI entity portions of the communication that constitute an offer of terms to an agreement from the first entity and acceptance of the terms of the agreement by the second entity and an exchange of consideration; capturing with the trained AI entity an electronic representation of the portions that constitute the offer, the acceptance, and the exchange of consideration, and further capturing with the trained AI entity metadata to identify the conversation, and storing the portions and metadata for later verification of the agreement.

2. The method of claim 1 wherein the first entity is a human.

3. The method of claim 2 wherein the second entity is a human or an electronic communicator.

4. The method of claim 3 wherein the electronic communicator is an interactive voice response system.

5. The method of claim 4 wherein the interactive voice response system is implemented by a server and a memory.

6. The method of claim 5 wherein the interactive voice response system is in electronic communication with the AI.

7. The method of claim 6 wherein the interactive voice response system receives words spoken by the first entity.

8. The method of claim 6 wherein the interactive voice response system receives words written by the first entity.

9. The method of claim 6 wherein the interactive voice response system receives DTMF tones entered by the first entity.

10. The method of claim 6 wherein the interactive voice response system generates oral responses to the first entity.

11. The method of claim 10 wherein the interactive voice response system generates oral responses by playing prerecorded messages or synthesizing voice responses.

12. The method of claim 6 wherein the interactive voice response system generates written responses by selecting responses from a plurality of written responses.

13. The method of claim 1 wherein the metadata includes one or more of the following: date, time, user identifier, and interaction device identifier.

14. The method of claim 13 wherein the interaction device identifier indicates whether the caller is using a land line, a cell phone, a computer, or a voice over the Internet device.

15. The method of claim 1 further comprising a call center in communication with the second entity.

16. The method of claim 15 wherein the call center receives calls from the first entity and forwards it to the second entity.

17. The method of claim 1 wherein the step of training the AI entity to accurately recognize from an electronic representation of a conversation between two parties that an offer has been made by a first party includes the step of training the AI entity to recognize words.

18. The method of claim 1 wherein the second entity is a virtual entity.

19. The method of claim 18 wherein the virtual entity is Siri, Alexa, or Cortana.

* * * * *